(12) United States Patent
Powers et al.

(10) Patent No.: US 7,290,264 B1
(45) Date of Patent: Oct. 30, 2007

(54) COMMUNICATION BETWEEN SOFTWARE ELEMENTS

(75) Inventors: Simon J Powers, Ipswich (GB); Michael R Hinds, Felixstowe (GB)

(73) Assignee: British Telecommunications public limited company, London (GB)

( * ) Notice: Subject to any disclaimer, the term of this patent is extended or adjusted under 35 U.S.C. 154(b) by 281 days.

(21) Appl. No.: 09/959,935

(22) PCT Filed: Jun. 9, 2000

(86) PCT No.: PCT/GB00/02245

§ 371 (c)(1),
(2), (4) Date: Nov. 13, 2001

(87) PCT Pub. No.: WO00/77630

PCT Pub. Date: Dec. 21, 2000

(30) Foreign Application Priority Data

Jun. 11, 1999 (EP) .................................. 99304559

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/315; 719/313

(58) Field of Classification Search ................ 709/204, 709/203, 205, 317; 719/310–320, 328–330; 463/42; 715/706, 757, 759, 852
See application file for complete search history.

(56) References Cited

U.S. PATENT DOCUMENTS 6,324,543 B1 * 11/2001 Cohen et al. ................ 707/200

(Continued)

FOREIGN PATENT DOCUMENTS

EP           0660231 A2      6/1995

(Continued)

OTHER PUBLICATIONS

The Open Group; DCE 1.1: Remote Procedure Call, 1997, Chapters Introduction to the RPC API and Remote Procedure Call Model.*

(Continued)

*Primary Examiner*—William Thomson
*Assistant Examiner*—Diem K Cao
(74) *Attorney, Agent, or Firm*—Nixon & Vanderhye P.C.

(57) ABSTRACT

It will be well known that a so-called object-oriented approach to computer programming has become widespread over the past few years and applications such as large multiplayer games are no exception. A number of approaches to allowing objects to communicate with one another have been developed. One set of these approaches relate to allowing so-called distributed objects, which is to say objects distributed over a client/server system, to communicate with one another. With reference to applications such as large multiplayer games, dynamic real time distributed communications between mobile objects must be considered. Present day techniques, involving the use of simple TCP/IP or UDP/IP, CORBA or DCOM are unable to provide such real time dynamic performance. According to one aspect of the invention a method of providing communication between two or more application software elements is provided comprising associating each application software element with a communication software element through which to send and/or receive messages, holding the communication state of the associated application software element in each communication software element, allowing each application software element to communicate with other application software elements by sending and receiving messages through the respectively associated communication software elements and allowing each application software element and associated communication software element to move. Holding the communication state in the communication software element associated with each application software element allows the application software element and communication software element assembly to communicate and move in particularly dynamic fashion. Messaging consequently enabled, carried out on a per software element basis, allows for continuity of communication between objects even if they move in a dynamic fashion.

8 Claims, 8 Drawing Sheets

U.S. PATENT DOCUMENTS

| | | |
|---|---|---|
| 6,345,314 B1 * | 2/2002 | Cole et al. .................. 719/316 |
| 6,411,988 B1 * | 6/2002 | Tafoya et al. ............... 709/204 |
| 6,415,315 B1 * | 7/2002 | Glass ......................... 709/201 |
| 6,434,595 B1 * | 8/2002 | Suzuki et al. ............... 709/202 |
| 6,496,871 B1 * | 12/2002 | Jagannathan et al. ....... 719/317 |
| 6,718,399 B1 * | 4/2004 | Chernick et al. ........... 719/330 |
| 2003/0105735 A1 * | 6/2003 | Kukura et al. ................. 707/1 |

FOREIGN PATENT DOCUMENTS

| | | |
|---|---|---|
| EP | 0689137 A2 | 12/1995 |
| EP | 0911730 A1 | 4/1999 |

OTHER PUBLICATIONS

Birrell et al., "Network Objects" Software Practice & Experience, GB, John Wiley & Sons Ltd., Chichester, vol. 25, No. S04, pp. S4-87-S4-130, XP000655554.

Chen et al., "Reflective Object-Oriented Distributed System for Heterogeneous Multimedia Environments" Computer Communications, NL, Elsevier Science Publishers BV, Amsterdam, vol. 19, No. 8, pp. 698-706, XP000614837.

Vinoski, "Distributed Object Computing With Corba", C++ REPORT, US, New York, NY, vol. 5, No. 6, pp. 33-38, XP000749810.

* cited by examiner

COMMUNICATION BETWEEN SOFTWARE ELEMENTS

BACKGROUND

1. Field of Art

The present application relates to provided a method of and apparatus for providing communication between two or more software elements. The invention disclosed herein has particular, but not exclusive, application to dynamic real-time distributed systems with highly mobile software elements.

2. Related Art

Well known examples of present-day architectures used by such applications to enable the interaction of a number of clients will be discussed having regard to FIGS. 1(a)-(b) and 2.

FIG. 1(a) illustrates a very simple interconnection of each client to all other clients. It will be clear that such an approach will very quickly become impractical as the number of clients rises. It might easily be wished that, for example, one hundred clients are to interact.

FIG. 1(b) illustrates a more sophisticated approach where each client is connected to a single central server. The concept of a client/server arrangement and associated terminology will be well known. However, as soon as the number of clients begins to rise this approach also becomes impractical. If, for example, hundreds of clients were to interact in any non-trivial manner, a single present-day server would simply be overwhelmed by both the computational load and the network traffic.

FIG. 2 illustrates a more sophisticated approach where each of a number of clients is now connected through an interface not to a single central server but to a server cluster comprising multiple servers. Whilst this approach retains the ability to manage the application in a central fashion at the server cluster, it also allows both the computational load and the network traffic to be distributed amongst the multiple servers of the server cluster.

It will be well known that a so-called object-oriented approach to computer programming has become widespread over the past few years and applications such as large multi-player games are no exception. The concept of an object and associated terminology will be well known. The term 'game component' will here be used to refer to a game object, i.e. any self-contained grouping of code and data that represents some aspect of a game implementation.

Typically, each of the servers of the server cluster will be running multiple processes and each process will be hosting multiple game components. It will be understood that with this approach that there will be some components, for example a so-called 'login manager', that are only to be instanced once, at a fixed location. Other components, for example a disintegrator pistol, might be instanced many times, in many different locations. Indeed, it might well be the case that such a component might be passed from a first game-player, playing on a first client, to a second player, playing on a second client. In this way, it would be necessary for the component to move from the first client up to the server cluster and then back down to the second client.

This architecture will also be required to be dynamic in other ways.

As the size or complexity of such multi-player games increases or as the number of joined clients increases, it may be desired to increase the number of servers in the server cluster. As mentioned above, in this way the computational load associated with the hosting of the game and the network traffic generated in the course of playing the game may be distributed or balanced over a number of individual servers. It may also be desired for new servers with particular functionality to be joined to the server cluster, for example a sophisticated Artificial Intelligence (AI) engine.

Further, as the game environment evolves, it may well be the case that the computational tasks required to maintain it change. New processes may be created and old processes destroyed as required.

The developer of applications such as large multi-player games therefore faces a considerable challenge in working with such a highly dynamic and distributed architecture. It will be clear that, in particular, the problem is posed of allowing such real-time, low latency communication between the distributed game components as will allow a highly dynamic and distributed multi-player game to be played.

Given the widespread interest in object-oriented computer programming as mentioned above, it is well known that there are, at the present time, a number of approaches to allowing objects to communicate with one another. Of particular interest, having regard to the abovementioned problem, are the different approaches to allowing so-called distributed objects, which is to say distributed over a client/server system, to communicate with one another.

A good introduction may be found in 'The Essential Distributed Objects Survival Guide', By Robert Orfali, Dan Harkey and Jeri Edwards, published by John Wiley & Sons Inc in 1996.

By way of a first example, a client/server implementation might be implemented simply using the standard Transmission Control Protocol/Internet Protocol (TCP/IP) Berkeley socket API. However, many problems would immediately arise including:

(a) Each client would have to continually create and destroy connections to all the relevant server processes (where the definition of 'relevant' changes regularly) introducing problems of latency and processing overhead.

(b) Game components changing their location (i.e. moving between processes) would create problems of location tracking and data sequencing. While a TCP/IP link guarantees data ordering between each end, communication between mobile game components will involve multiple TCP/IP links, where no relative sequence information is maintained.

(c) The enforced sequencing of TCP/IP links can dramatically increase the perceived latency between clients in the environment. For example, if in the sequence 'Player A says hello, Player B shoots you', the first element is lost in transit, then the second element will be delayed whilst a timeout/retransmission mechanism is invoked.

A further simple implementation might use User Datagram Protocol/Internet Protocol (UDP/IP) instead of TCP/IP. However, whilst the enforced sequencing problem is removed, so is, for example, any concept of data sequencing or reliable delivery.

The now well known Common Object Request Broker Architecture (CORBA) and Distributed Component Object Model (DCOM) provide generic mechanisms for sharing information between distributed objects over a network. However, the basis of the CORBA/DCOM approach has been to try and hide the very existence of the network in providing a uniform object interface. Whilst these are powerful techniques, they are not applicable to highly time-critical and traffic volume sensitive applications. It is instead essential to maintain control over how network traffic is distributed and handled. Related technologies may, for example, for example, rely on the asynchronous retrieval of messages from a centralized queue.

Thus, these present-day approaches are simply not able to provide a solution to the problem outlined above.

BRIEF SUMMARY

According to a first aspect of the invention however, there is provided a method of providing communication between two or more software elements, a host computer means being arranged to host application programs to host application software elements in a host space, two or more application software elements being hosted in said host space; the method comprising:

- associating each application software element with a communication software element through which to send and/or receive messages;
- holding the communication state of each associated application software element in its associated communication software element;
- allowing each application software element to communicate with other application software elements by sending and receiving messages through the respectively associated communication software elements; and
- allowing each application software element and associated communication software element to move in said host space.

Holding the entire communication state in the communication software element associated with any given software element allows the application software element and communication software element assembly to communicate and move in particularly dynamic fashion. The messaging consequently enabled, carried out on a per element basis, allows for continuity of communication between software elements even if they move in such a dynamic way.

According to another aspect of the invention there is provided an apparatus to provide for communication between two or more software elements comprising:

- host computer means arranged to host application programs to host application software elements in a host space;
- two or more application software elements hosted in said host space;
    - each application software element having an associated communication software element through which to send and/or receive messages;
        - each communication software element holding the communication state of the associated application software element;
- messaging means arranged to allow messaging between communication software elements; and
- movement means arranged to allow software elements to move in said host space.

Again, holding the entire communication state in the communication software element associated with any given software element allows the application software element and communication software element assembly to communicate and move in particularly dynamic fashion. The messaging consequently enabled, carried out on a per element basis, allows for continuity of communication between software elements even if they move in such a dynamic way.

BRIEF DESCRIPTION OF THE DRAWINGS

One embodiment of the invention will now be described, by way of example, having regard to the accompanying drawings, in which.

DETAILED DESCRIPTION OF EXEMPLARY EMBODIMENTS

Server Cluster Architecture

Figure 1A:
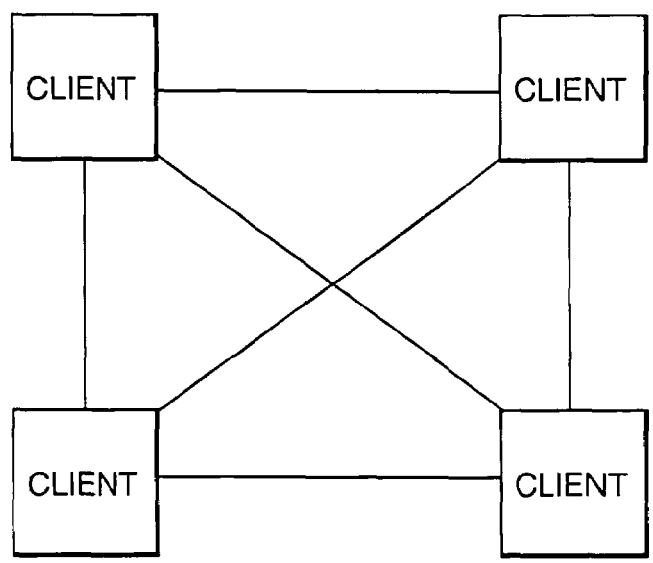
FIGS. 1(a), 1(b) and 2 illustrate typical client/server connections.
Figure 1B:
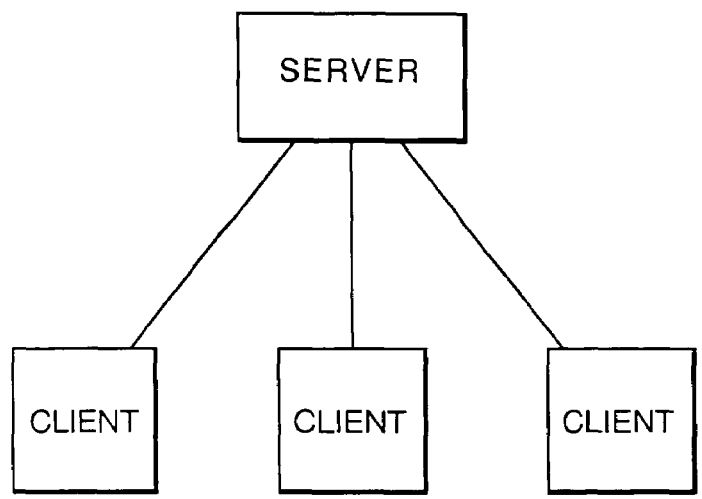
Figure 2:
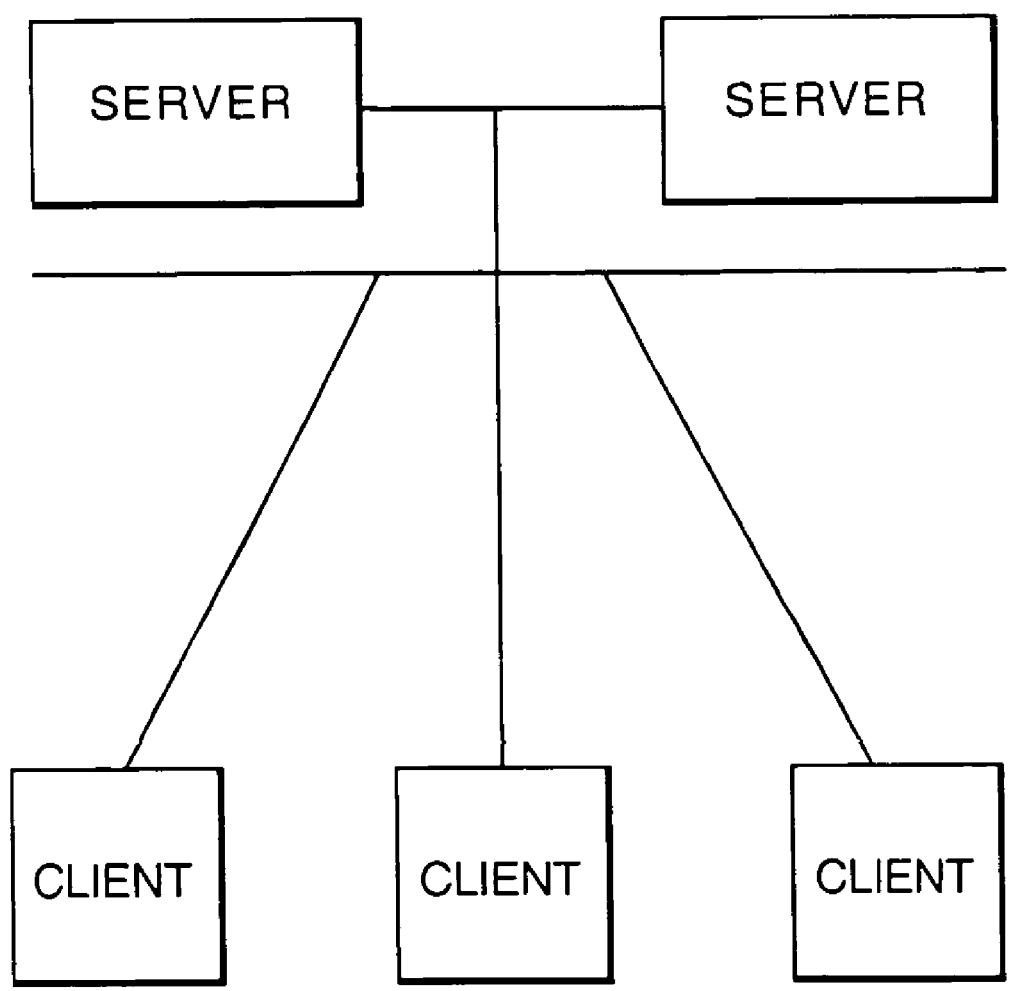
Figure 3:
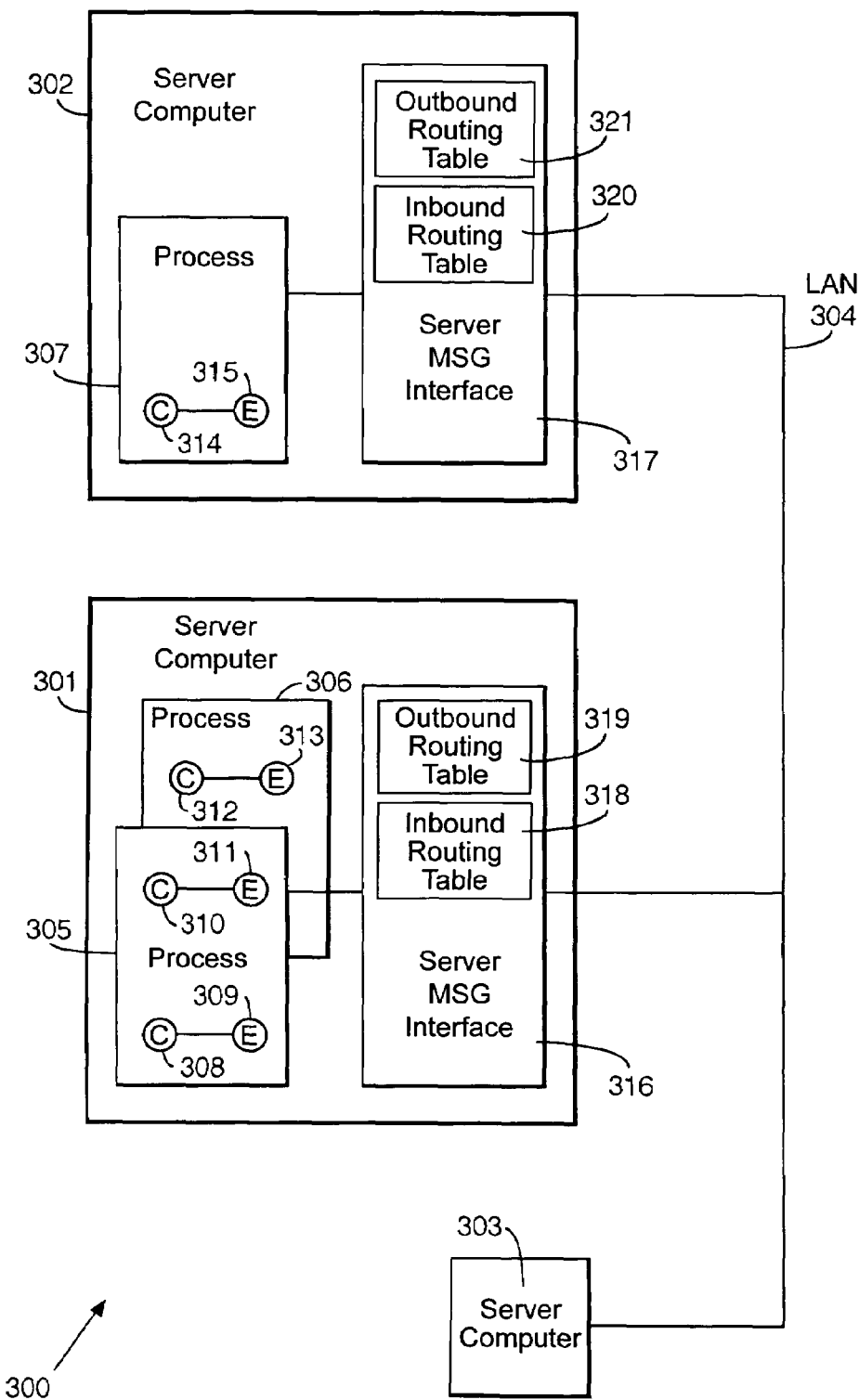
FIG. 3 represents a server computer cluster suitable for use with the invention.

FIG. 3 illustrates one example of a simple server cluster (300) and network configuration suitable for use with this exemplary embodiment of the invention. The suitable server computer cluster (300) is shown as having a first server computer (301), a second server computer (302) and a third server computer (303) interconnected via a Local Area Network (LAN) (304).

Suitable computers will be well known, running for example varieties of Unix (Irix, Linux and Solaris) or Microsoft Windows™.

As will be discussed further below with reference to FIG. 7, a number of client computers (not shown in FIG. 3) may be connected to the server computer cluster 300.

The first server computers (301) hosts first and second server processes (305, 306), and the second server computer (302) hosts a third server process (307). Each such server process (305, 306, 307) hosts one or more application related components (308, 310 312, 314). As discussed above, each component is taken to describe a self-contained grouping of code and data that represents some aspect of an application implementation. The term "software element" may likewise be used in place of component or object.

In the terms of a game developer, the server processes (305, 306, 307) might represent, for example, rooms in a virtual environment. The components (308, 310, 312, 314) hosted in such processes might then be objects in such rooms. Often these objects will need to be able to move, the avatars of characters in the game are one obvious example but, for example, a disintegrator pistol might be able to be picked up and move from one room to another.

As will be explained, each component (308, 310, 312, 314) is associated with a so-called 'endpoint' (309, 311, 313, 315). Each such endpoint has a unique system-wide address. The purpose of such endpoints being associated with components, as will become clear, is to allow the components to communicate with each other through the sending and receiving of messages through their respective endpoints.

First, second, third and fourth components (308, 310, 312, 314) are illustrated, having respective first, second, third and fourth endpoints (309, 311, 313, 315). The first and second components (308, 310) and their associated endpoints (309, 311) reside in the first server process (305) hosted on the first server computer (301). The third component and associated endpoint (312, 313) reside in the second server process (306) hosted on the first server computer (301). The fourth component and associated endpoint (314, 315) reside in the third server process (307) hosted on the second server computer (302).

The sending of messages to and from components located in different server processes is achieved through the use of Server Messaging Interfaces (316, 317). One such Server Messaging Interface (SMI) is provided per server. Thus, messaging between the illustrated endpoints is handled by first and second Server Messaging Interfaces (316, 317) hosted on the first and second server computers (301, 302) respectively.

Each server Messaging Interface maintains a pair of routing tables. An outbound routing table maps a destination endpoint address to the Server Messaging Interface responsible for the server process in which the destination endpoint address is to be found. An inbound routing table maps a destination endpoint address to the server process running on that server, for which that Server Messaging Interface is responsible, in which the destination endpoint address is to be found. The first Server Messaging Interfaces (316) is illustrated as having first inbound and outbound routing tables (318, 319 respectively). The second Server Messaging Interface (317) is illustrated as having second inbound and outbound routing tables (320,321 respectively). These routing tables will be updated on such events as the creation and movement of endpoints and their associated components, as will be discussed below.

Creation Of Components & Endpoints And Allocation Of Addresses

Figure 4:
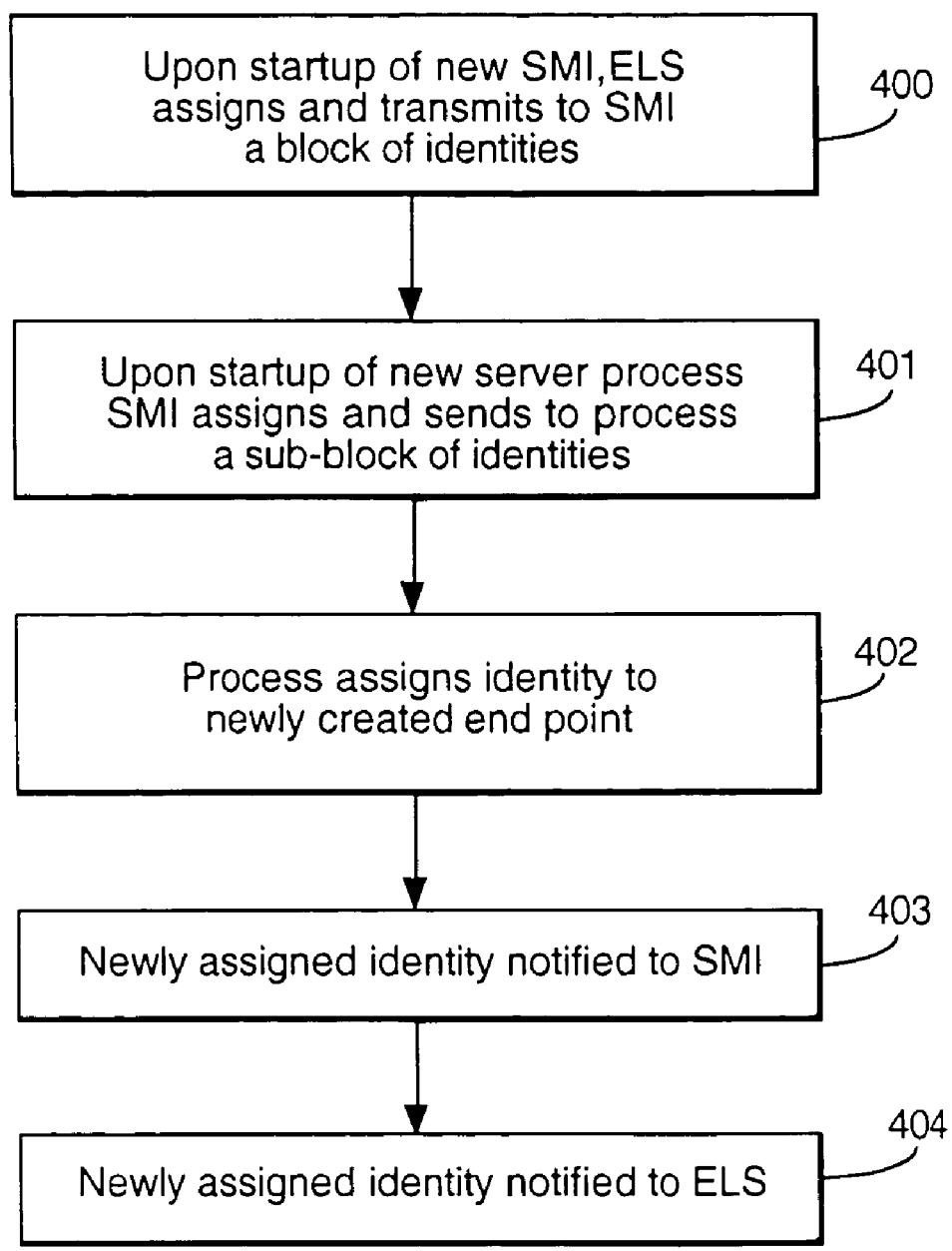
FIG. 4 represents an endpoint identity allocation process flowchart.

The process by which the allocation of a unique system-wide identity to an endpoint takes place will now be illustrated having regard to FIG. 3 and to FIG. 4, an endpoint address allocation process flowchart.

The third server computer (303), interconnected with the first and second server computers (301,302) on the LAN (304), functions in this embodiment as a so-called Endpoint Location Server. In a first step (400), upon the startup of a new Server Messaging Interface, the Endpoint Location Server 303 will assign and transmit to the new Server Messaging Interface, a block of identities for release to newly created endpoints.

In a second step (401), upon startup of a new server process within the server associated with the Server Messaging Interface, the Server Messaging Interface will assign and send to the new process a sub-block of identities for release to newly created endpoints. In this way, this sub-block of identities is available for the server process to assign as and when required.

The process of the creation of a component object, taking place under the control of the application server process, will involve the assignment of such an identity. For a component to be able to communicate with other components in different processes, it will need to have an endpoint associated with it. Thus, during the process of instantiation of a component by the server process in question, a call will typically be made requesting the creation of an endpoint.

The server process will then create an endpoint object as required, including, in a third step (402), assigning to the endpoint one of the identities from the sub-block held by the server process. By way of example in the present embodiment, a 32 bit system wide identity may be provided to each endpoint.

As will be discussed further below however, the endpoint will contain not just this system identity but also the complete communication state of the associated component.

Once an endpoint has been so created, the server process can then pass a pointer back to the component, binding that endpoint to the component. Typically, the component can then provide a series of function addresses to an endpoint, allowing the endpoint to communicate asynchronous events back to the component (for example, on receipt of a message for the component).

In a fourth step (403), the address allocated to the endpoint associated with the newly instantiated component is notified to the Server Messaging Interface. The Server Messaging Interface then updates its inbound routing table.

In a fifth step (404), this notification is further passed to the Endpoint Location Server 303, the global endpoint identity store.

It will be appreciated that the above indicated steps may be carried out in a different order from that shown. By way of an alternative, for example, the return of the endpoint to the newly instantiated component and the hooking of the endpoint to the relevant callback functions by the component may be carried out after the fourth and fifth steps above.

In this way, if and when new component objects are instantiated and thus require new endpoints through which to communicate, addresses allowing the endpoint a system-wide identity can be allocated directly from the server process responsible for the instantiation. No asynchronous request to a distant address allocation process, involving an inconvenient delay, need be made.

Should a particular server process run low on addresses, for example should the number of addresses available to it fall below a predetermined threshold, then the server process can request another sub-block from the Server Messaging Interface ahead of needing to allocate them. Likewise should the Server Messaging Interface run low on addresses, it can request a new block from the Endpoint Location Server in similar fashion.

A predefined block of system-wide addresses might further be held back from this process by the Endpoint Location Server, in order to provide static addresses for objects of particular importance.

Further, the Endpoint Location Server may track which identity blocks it has issued and the number of identities that remain unused within each block. When an endpoint is released, the Endpoint Location Server is notified by the relevant Server Messaging Interface, and it can decrement the unused identity count in the relevant block. In like fashion, if a process terminates, all the as yet unallocated identities are returned to the Endpoint Location Server so that they can be ticked off from the relevant blocks. When the unused identity count for any given block hits zero, the block can then be returned to the pool for re-issuing.

Simple Messaging Between Stationary Objects

Components hosted within the same process can communicate directly by making method calls on each other. Components hosted in different processes yet running on the same server computer, whilst making use of the endpoint mechanism, can take advantage of shared memory, such that whilst the message sending mechanism looks identical irrespective of where the destination is, messages moving between processes are transferred simply by passing pointers around.

According to the invention however, for communication between components located on different server computers, the use of endpoints is required as follows.

A variety of mechanisms exist for components to discover the existence of other relevant components. To take the above example of server processes representing rooms in a virtual environment, a RoomManager object may be created for each room. All components instantiated within each room may then message the RoomManager object to inform it of their existence. Each RoomManager object may in turn then oversee the interaction, through messaging, of the components present in the respective rooms.

Figure 5:
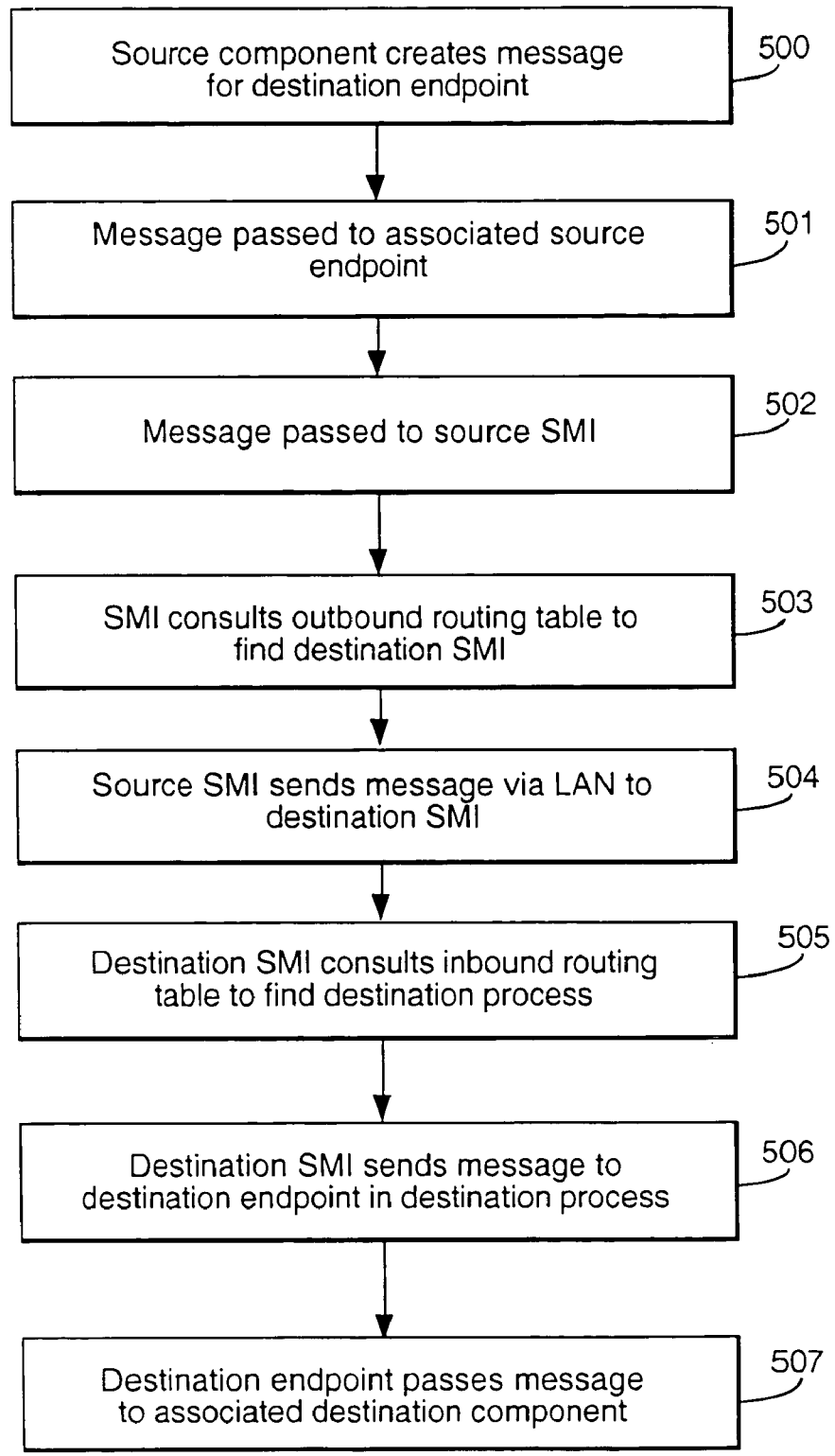
FIG. 5 represents a component to component messaging process flowchart.

By way of example, the process of sending a message from the first component to the fourth component will now be illustrated having regard to FIG. 3 and the component to component messaging process flowchart of FIG. 5.

In a first step (500), the first component (308) hosted in the first server process (305) on the first server (301) creates a message intended for the fourth component (314) hosted in the third server process (308) on the second server (302). In a second step (501) this message is passed to the associated first endpoint (309). In a third step (502), the message, with an indication that it is to be sent to the fourth component (314), is then sent to the first Server Messaging Interface (316), this being the Server Messaging Interface associated with the server (301) on which the first server process (305) is running.

In a fourth step (503), the first Server Messaging Interface (316) consults the associated first outbound routing table (319) to find out which Server Messaging Interface is responsible for the server process in which resides the component to which the message is addressed. If, as will be discussed further below, a routing table does not have a cached copy of the required address, it may send a request, via the LAN, to the Endpoint Location Server (303). The Endpoint Location Server (303) will then respond with the required address of the component as best known to it. The Server Messaging Interface (316) can then cache that returned address for future use. In this example, either the routing table (319) or the Endpoint Location Server (303) will indicate that messages for the fourth component (314) should be sent to the second Server Messaging Interface (317).

In a fifth step (504), the first Server Messaging Interface (316), hosted on the first server computer (301), sends the message via the LAN (304), to the second Server Messaging Interface (317) hosted on the second server computer (302). In a sixth step (505), the second Server Messaging Interface (317) then consults the associated second inbound routing table (320) to determine in which server process is hosted the endpoint associated with the fourth component (314) to which the message is to be sent. This second inbound routing table (320) should have cached the information identifying the server process on which the fourth component (314) is hosted, either when the fourth component (314) was instantiated in the third server process (307) or when the fourth component (314) moved to the third server process (307) from elsewhere. The movement of such components will be discussed further below.

In this example, the inbound routing table (320) will reveal that the fourth endpoint (315), associated with the fourth component (314), resides in the third server process (307). In a seventh step (506), the second Server Messaging Interface (317) then sends the message to the fourth endpoint (315), hosted in the third server process (307). In an eighth step (507), the fourth endpoint (315) then passes the message to the fourth component (314).

It is to be noted in the above that the message is itself not always being passed around. Only when the message is sent over the network (LAN 304) is there some concept of bytes being read and then written. When moving between a Server Messaging Interface and its associated server processes there is effectively only a key to the message which is being shipped around (which is typically only a few bytes big). This key can be quickly mapped back to a pointer to the actual message data.

Moving Objects

As indicated above, one of the results of holding the entire communication state in the endpoint associated with any given component is that the component and endpoint assembly become suitable to be moved in dynamic fashion between processes. The messaging according to the invention, carried out on a per object basis, allows for continuity of communication between components even if they move in such a dynamic way.

Components will come in many varieties of form and size. A component may be instructed by a server process to move from one process to another. The component can then be serialized by the first process and transmitted to the destination process as a message. This message, upon receipt at the destination process, can then be unbundled and the component rebuilt. The manner in which the serialization, transmission and unbundling is to be done will depend to a great extent on the choice of the developer in question.

The endpoints will likewise need to be moved with their associated components but the serialization, transmission and unbundling of the endpoints can be carried out in more uniform fashion given the well-known nature of the endpoints themselves.

Figure 6:
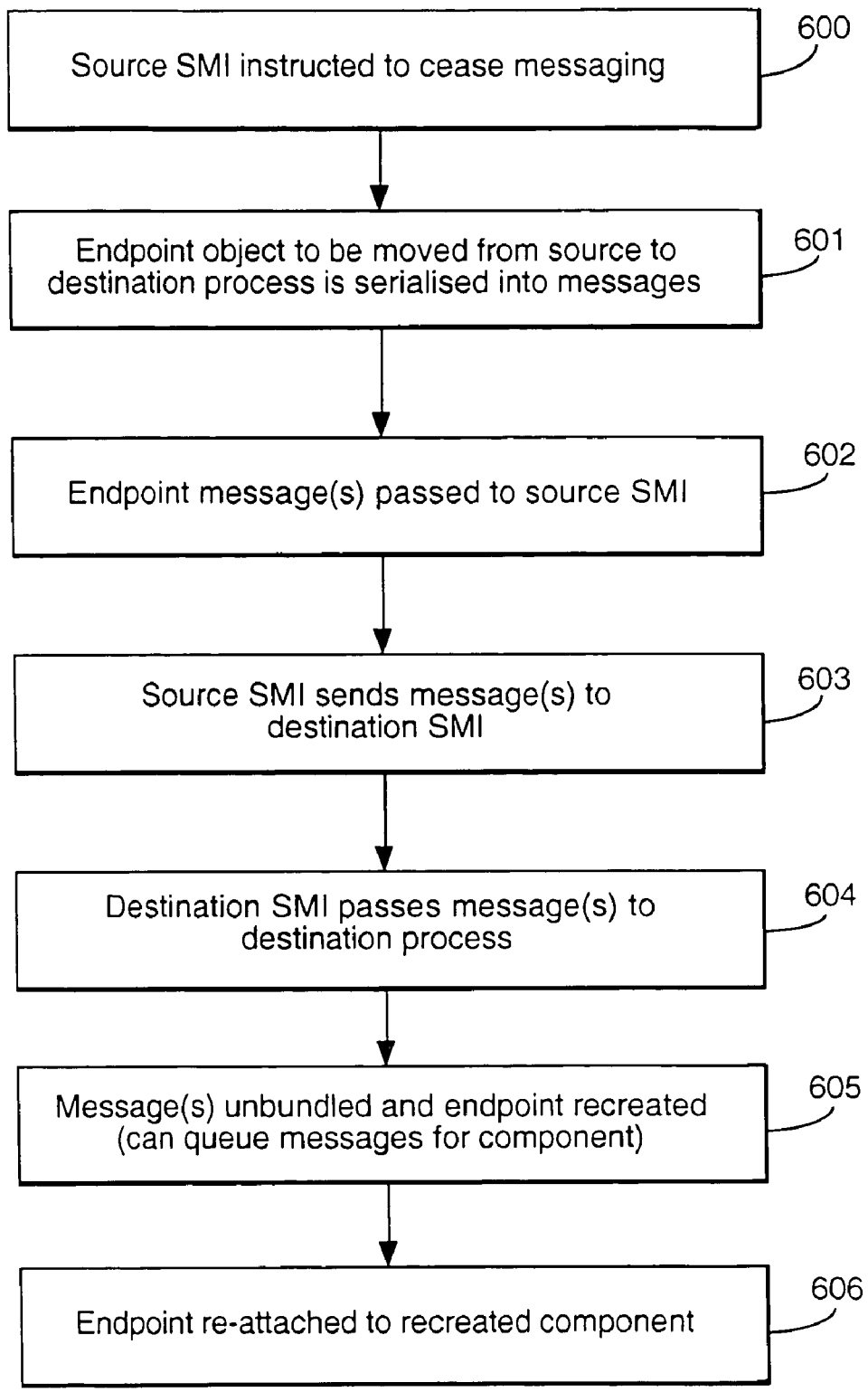
FIG. 6 represents an endpoint movement process flowchart.

By way of example, the process of moving an endpoint 313 from the second server process 306 to the third server process 307 will now be illustrated having regard to FIG. 3 and the endpoint movement process flowchart of FIG. 6.

Following an instruction for the third endpoint 313 to move to the third server process 307, in a first step (600), the first Server Messaging Interface 316 is instructed to cease transmitting messages for the third endpoint 313.

In a second step (601), the third endpoint object 313, including its state, is serialized. This serialization produces one or more packet messages, each header including a destination identity and a bytestream payload (The state of an endpoint may be quite 'large', in particular, in excess of the number of bytes available in a single message).

It will be recalled that, as indicated above, the parallel process of transport of the associated component 312 is to be carried out in the manner specified by the developer in question (who will have knowledge of the developer-created components, thus enabling an efficient transfer to be effected).

In a third step (602), the message or messages are passed to the first Server Messaging Interface 316.

The destination identity mentioned above has, for example, the destination Messaging Interface 317 and the destination process 307 encoded into it by means of a pair of 16 bit values, which can be extracted to determine to where the message series is to be forwarded. In this case the first Server Messaging Interface 316 will find that the message must be sent to the second Server Messaging Interface 317.

In a fourth step (603), the message is sent to the second Server Messaging Interface 317, being the Server Messaging Interface responsible for the intended destination process 307. As will be discussed below, these messages can be transported with an indication that they contain high-level control information rather than, for example, containing an inter-endpoint message.

The first Server Messaging Interface 316 will also update its first inbound routing table to the effect that the third component 313 is no longer hosted in any of the processes for which the first Server Messaging Interface 316 has responsibility. It will update the first outbound routing table 319 to the effect that the third component 313 has moved to a server process for which the second Server Messaging Interface 317 is responsible.

In a fifth step (604), the message is then passed to the destination server process, in this case the third server process 307.

In a sixth step (605), the message is then unbundled to recreate the third endpoint 313 in the third server process 307 as required. Once recreated, the third endpoint 313 can then be re-attached to the third component 312 once that has been recreated in the third server process 307. It is to be noted that, as a part of its communication state, the endpoint 313, once recreated, can accept and queue messages intended for its associated component 312, even if the parallel process of transporting the associated component has not yet recreated the component at that time.

In this way, the third component 312 and associated endpoint 313 will have moved from the second server process 306 on the first server computer 301 to the third server process 307 on the second server computer 302. It will be appreciated that, whilst the third component 312 with associated endpoint 313 could take part in messaging before the instruction to move and can continue to do so after recreation, they cannot generate messages during the short period of time whilst the component and associated endpoint are in transit in message form.

However, as a result of the updating of the routing tables 318, 319 of the first Server Messaging Interface 316, should messages for the third component 313 be received by the first Server Messaging Interface 316 after the movement of the third component 313 out of the second server process 306, the first Server Messaging Interface 316 can simply forward the messages to the second Server Messaging Interface 317 for delivery to the re-established endpoint. In particular, if a message for the endpoint arrives at the first Server Messaging Interface 316 it will first use the first inbound routing table 318 to attempt to deliver it to the relevant process. That attempt will fail since the endpoint 315 is no longer located in a process for which the first Server Messaging interface 316 is responsible. The first Server Messaging Interface 316 will then route the message onwards using the first outbound routing table 319 which will identify the location 307, to which the endpoint 315 has moved.

A yet more sophisticated discussion of messaging to invalid destinations will be discussed further below.

Client/Server Cluster Architecture

As was indicated above in the discussion having regard to FIG. 3, a number of client computers may be connected with the server computer cluster 300. Again, suitable computers will be well known, for example, computers running Microsoft Windows™.

Figure 7:
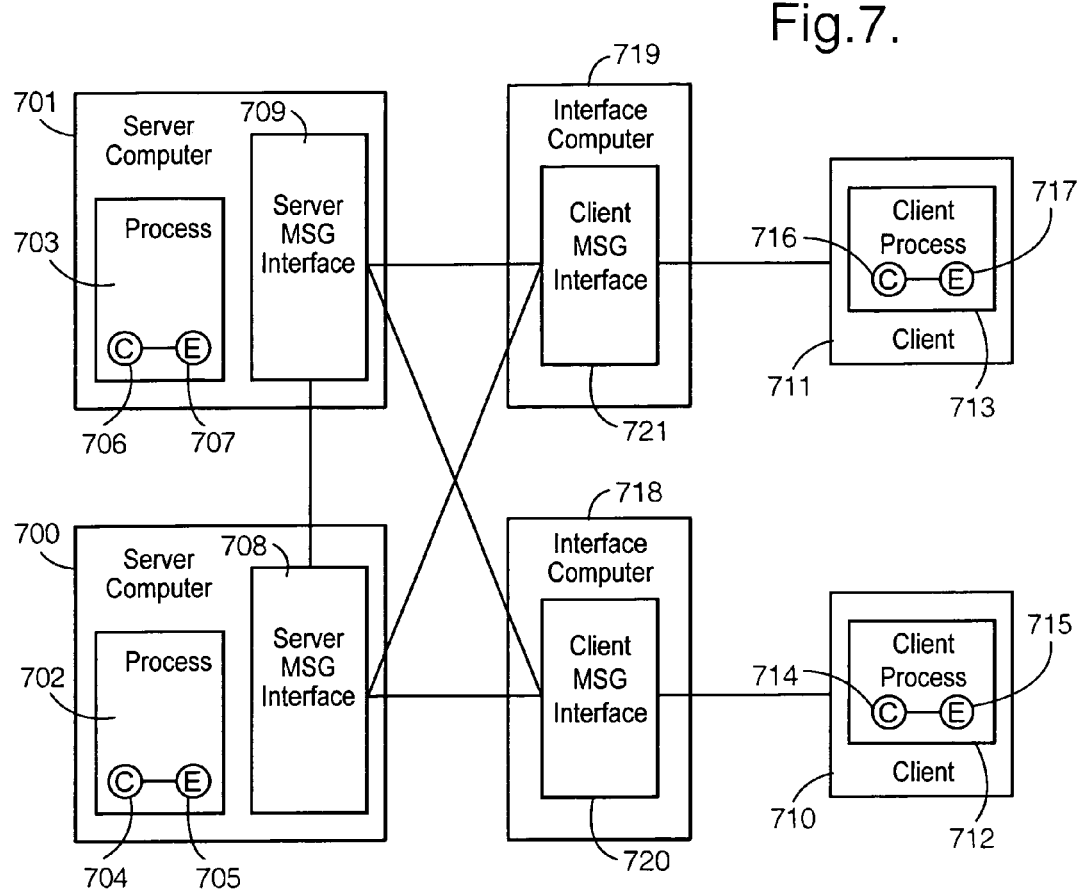
FIG. 7 represents a client/server arrangement suitable for use with the invention.

FIG. 7 illustrates a server computer cluster including first and second server computers (700,701) as, for example, illustrated in FIG. 3. Again each server computer (700,701) hosts at least one respective server process (702,703). Yet again, each server process hosts at least one respective component (704, 706) and respective associated endpoint (705,707). Yet again, each server computer (700, 701) is provided with a respective Server Messaging Interface (708, 709).

FIG. 7 further illustrates a number of client computers (710,711). Each client computer hosts at least one respective client process (712,713). Each client process hosts at least one respective component (714, 716) with a respective associated endpoint (715,717).

The client computers (710,711) are each connected, through respective first and second interface computers (718,719), to both the first and second server computers (700,701) of the server computer cluster. Each server computer (700, 701) is connected to each interface computer (718, 719) via a high bandwidth link, using a reliable packet connection protocol such as TCP/IP. Each client computer (710,711) is connected to only one of the interface computers (718, 719 respectively) via a low bandwidth link such as that provided using a Modem over a PSTN connection. An unreliable packet connection protocol such as UDP/IP is suitably used. The first and second interface computers (718,719) are provided with respective first and second Client Messaging Interfaces (720,721).

It is desirable to include in the messaging mechanism an ability to indicate 'hints' as to the nature of the message. These might include, for example, indications as to message priority and a priority time modification, a time-to-live, a content-combination indicator and a reliability flag. In this way, the Client Messaging Interfaces (720, 721) may react to the hints associated with each message, in particular in circumstances where congestion exists on the low bandwidth link, to manage the link traffic to the clients as efficiently as possible.

A particularly suitable and advantageous scheme for such management of a low-bandwidth link is indicated in the applicant's United Kingdom patent application GB 9907445.2, from which priority is claimed by published International Patent Application W000/62506.

A game component (704) hosted in a server process (702) can create a message intended for a game component (714) located in a client process (712). This message can then be sent via the endpoint (705) associated with that game component (704). The message is then passed to the Server Messaging Interface (708) associated with the server (700) on which that process is running. The Server Messaging Interface (708) can consult the addressing table to find out which Client Messaging Interface (720) is responsible for the client process (712) in which resides the component (714) to which the message is addressed.

It will be appreciated that in seeking to determine where the destination endpoint can be 'reached', the Server Messaging Interface (316, 708) locates the relevant Messaging Interface. This Messaging Interface might be either another Server Messaging Interface (317) (as in the example discussed with regard to FIG. 5 above) or a Client Messaging Interface (720) (as in this case).

The Server Messaging Interface (708) then sends the message to the relevant Client Messaging Interface (720) hosted on the appropriate Interface computer (718). The Client Messaging Interface (720) can then send the message, over the low-bandwidth connection between the Interface computer (718) and the client computer (710), to the client process (712). The message can then be delivered, through the associated endpoint (715), to the component (714) to which the message is addressed.

In like fashion, components (714, 716) hosted in process (712, 713) running on the client computers (710, 711) can message to components (706, 704) hosted in server processes (702, 703).

It is to be noted, by way of an alternative, that the interface computer (718, 719) could just as easily also host server processes, i.e. one machine running both a Server Messaging Interface and a Client Messaging Interface. Then as, for example, a game becomes more popular, additional machines can be added, with the option of reserving certain machines just for running the Client Messaging Interfaces.

Further, the Server Messaging Interfaces/Client Messaging Interfaces may include three distinct components:
(a) Messaging Interface—provides the in/out routing tables and sending of messages over the network
(b) Server Messaging Interface—Incorporates a Messaging Interface and an interface to the server processes.
(c) Client Messaging Interface—Incorporates a Messaging interface and an interface to the client processes.

(Although the Server Messaging Interface and the Client Messaging Interface are two distinct processes they will thus have a large portion of code in common, in the form of the Messaging Interface).

In this way, a distributed client/server system for e.g. playing games is provided, allowing, according to the invention, for highly dynamic movement and messaging of game component and associated endpoint objects.

Sophisticated Messaging Mechanisms

The above discussion of messaging has relied upon a relatively simple specification of communication state for the endpoints through which the sending of messages from one component to another takes place. Whilst, for example, it will be clear from the foregoing that a sequence of messages sent from one component to another component can all be routed to the intended destination component even if the components move during the messaging sequence, it will be appreciated that this simple mechanism does not ensure that the message sequence is received at the target component in the same order in which it was sent.

By way of a more complete description of the communication state of an endpoint, it will typically possess:
(a) Identity.
  32 bit value, unique within the system in which the endpoint was created.
(b) A list of unprocessed messages.
  This is a list of messages that have arrived at the endpoint but cannot yet be processed. This is used when the endpoint has been moved to a new location but is not yet attached to its object.
(c) A collection of outgoing distributors (as will be discussed).
  These are the distributors that the endpoint's associated object has created for sending messages.
(d) A collection of incoming distributors (as will be discussed).
  These are paired with outgoing distributors on remote endpoints, and act with their outgoing pair to ensure messages are delivered correctly.

For example, a message sent over a stream (see below) goes from a StreamOut (which gives it sequence number), over the wire, to a StreamIn which ensures messages are sorted before delivery. Incoming distributors are effectively hidden from the developer utilizing the techniques according to the invention, they are only created as a consequence of creating certain types of outgoing distributor.

Three more sophisticated messaging mechanisms, referred to as (I) "Stream", (II) "Replicator", and (III) "Source", will now be discussed.

(I) The first such messaging mechanism will be referred to as a 'stream'.

If a sequence of messages is sent out from the endpoint of one component to the endpoint of another component, invoking the stream mechanism for the sequence will ensure that the sequence arrives at the destination endpoint in the same order as it left the sending equipment.

Messages sent on a stream are labelled with a sequence number, together with their source and destination endpoint, and the identity of the stream used to send them. This sequence number can be used to re-order messages into their original sequence as they arrive at their destination endpoint. The initial data message sent on a stream is tagged as a 'stream start' message, which informs the receiving endpoint it must create an incoming stream distributor to handle messages arriving on that stream. The final message sent on a stream is a 'close stream' message, which informs the receiving endpoint it should destroy the associated incoming stream distributor.

The generation of an Outgoing Stream requires the following data:
(a) Identity
  16 bit value, unique within the endpoint it was created at.
(b) A destination endpoint identity.
  The destination for messages sent over the stream.
(c) A sequence number.
  This is the sequence number to stamp on the next message.
(d) A valid flag.
  Used to determine if the steam has detected a failure to deliver to its destination.

The generation of an Incoming Sequenced Stream requires the following data:
(a) 16 bit identity.
  This is the same as the identity of the outgoing version of the distributor, i.e. Identity is common to the In/Out Distributor pair.
(b) A sequence number.
  This is the sequence number of the next message to deliver to the Endpoint's associated object.
(c) An undelivered message list.
  This is the list of messages that have arrived out of sequence and must wait for missing messages before delivery.

(II) The second such messaging mechanism will be referred to as a 'replicator'.

A replicator may be used to send a particular message to multiple destinations. If a message is sent out from the endpoint of one component and is addressed to the multiple endpoints associated with multiple target components, invoking the replicator mechanism will ensure that the only the minimum number of copies of the message is made for all destination endpoints to receive the message. If, for example, a client component sends a message which is intended for delivery to multiple components hosted on the server computer cluster, then involving the replicator mechanism will ensure that the message is sent in only one copy up to the server computer cluster before being copied as required to be sent to each of the destination components, rather than sending one copy per destination object up to the server computer cluster. As will be clear, use of the replicator mechanism will help to keep network traffic to a minimum.

The generation of Outgoing Unsequenced Replication messages requires:

(a) Identity.

16 bit value, unique within the endpoint at which it was created.

(b) A list of destination endpoints.

The destination for messages sent over the replicator.

Outgoing Sequenced Replicator

A sequenced replicator offers the same advantages as an unsequenced replicator, that is efficient utilization of the network and a minimization of the traffic generated. In addition it also ensures that all messages are delivered to their destinations in the order they were sent. This is managed in a similar way to a stream distributor, with a sequence number attached to outgoing messages, and a incoming sequenced replicator distributor at each receiving endpoint. The only additional complication is discovered in the following sequence of operations:

1. Replicator r1 exists on endpoint e1.
2. Endpoint e2 is added to r1 and messages m1 and m2 sent via replicator r1.
3. Endpoint e2 is removed from r1 and messages m3 and m4 sent via replicator r1.
4. Endpoint e2 is added again to r1 and messages m5 and m6 sent via replicator r1.
5. Endpoint e2 is removed from r1.

If it is assumed that the simple stream mechanism (first message marked as 'start' and a final close message) was used, and these operations are performed in rapid succession, two separate and valid sequences would be on-route to e2. These are m1+'start flag'/m2/close and m5+'start flag'/m6/close. If message re-ordering in the network causes the second sequence to arrive first this would be processed as a valid sequence, and hence messages would be delivered in the wrong sequence.

The solution is to store destinations removed from a sequenced replicator, together with the sequence number at which it was removed, until the above race condition cannot occur. The amount of storage time will be governed by the latency within the network if a destination is re-added whilst the race condition is still possible then a new sequence is not created, instead a message is sent to advance ("pad") the receiver's sequence number to the value re-sending occurs at. To continue the previous example, the correct message sequence would be m1+'start flag'/m2/pad 2 to 5/m5/m6.

If a destination is not re-added to the replicator within the time period required for this race condition to resolve, then the final close message can then be sent. Again continuing the previous example, if after step (5) e2 is never again added to r1, the final message sequence is m1+'start flag'/m2/pad 2 to 5/m5/m6/ . . . delay . . . /close.

This final close message causes the incoming sequenced replicator distributor to be destroyed at the receiving endpoint. Its generation requires the following data:

(a) Identity.

16 bit value, unique within the endpoint at which it was created.

(b) A list of current destination endpoints.

The destinations for messages sent over the replicator.

(c) A sequence number.

This is the sequence number to stamp on the next message.

(d) A list of recently removed destination endpoints, with their 'remove' sequence count, and a "removed at" time.

This is used to track which endpoints were recently in the replicator's destination list, so if the endpoint's object adds one of them back again its sequence number can be advanced from its last value, rather than send a "start of sequence" message. This is necessary to avoid race conditions with rapid add/remove/add sequences.

The Incoming Sequenced Replicator operates as for "stream" but also includes "Close" flag, set if the sequence has been re-started (i.e. sender went remove x, wait, timeout x(=send closure to x), add x, send data (=send start sequence to x). If closure and start sequence race, the receiver might get them in the wrong order, hence a closure flag to pick up on a missing closure.

(III) The third such messaging mechanism will be referred to as a 'source'.

A source is similar to a replicator in that it provides for the sending of particular messages to multiple destinations. It differs from the replicator, however, in that instead of the sending component choosing which other components to send to, components can choose to 'subscribe' to messages sent from a 'chosen' source. A source will therefore allow for the 'publication' of widely used messages by a component, without the component having to concern itself with how to send the messages to all the components that need them. Rather, if a component needs messages from a particular source component, it can simply subscribe to the messages through the use of the source mechanism.

Generation of Outgoing messages from an Unsequenced Source requires:

(a) Identity.

16 bit value, unique within the endpoint at which it was created.

(b) A list of current destination endpoints with a subscribe count for each destination.

These are the destinations for messages sent over the source. The subscribe count is used to track the number of subscribe/unsubscribe messages received, so message order jumbling doesn't result in an invalid subscription state.

Generation of Outgoing messages from a Sequenced Source requires:

the same data, and also as for an unsequenced source, and also (c) A sequence number.

This is the sequence number to stamp on the next message.

(d) A list of recent destination endpoints, with their 'remove' sequence count, and a "removed at" time. This is used to track which endpoints were recently in the source's destination list, so if the endpoint's object decides to add them back again its sequence number can be advanced from its last value, rather than send a "start of sequence" message. This is necessary to avoid a race condition with rapid add/remove/add sequences.

The Incoming Sequenced Source: requires the same data as for the sequenced replicator.

It is to be noted that Unsequenced sources and replicators do not have incoming distributors. As messages arrive at their destinations they can simply be passed straight through.

Figure 8:
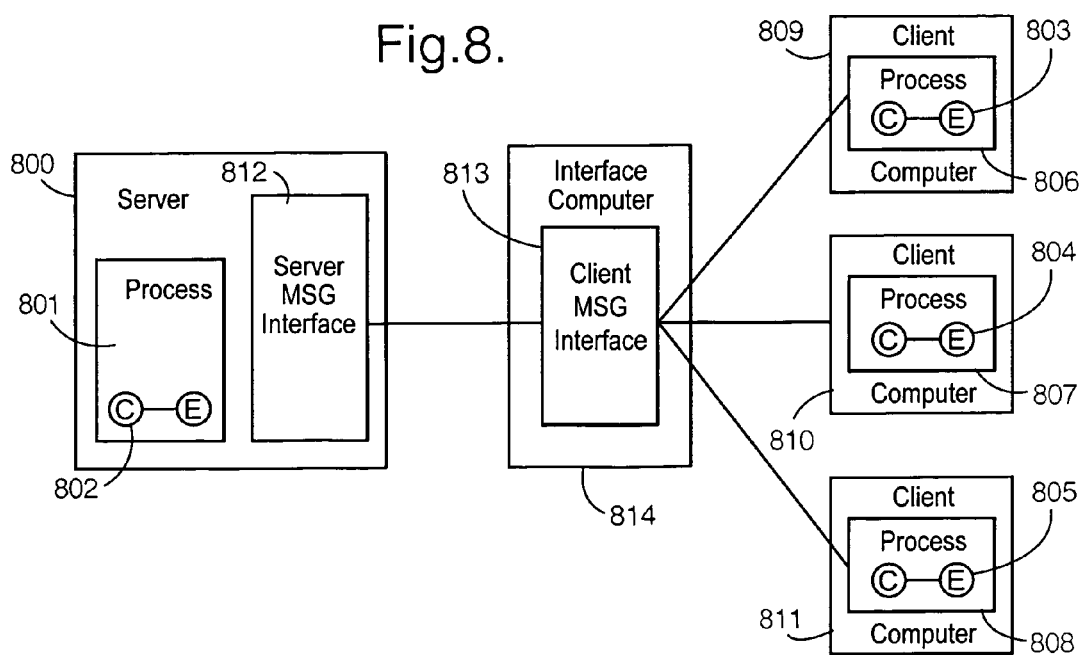
FIG. 8 represents a further suitable client/server arrangement.
Figure 9:
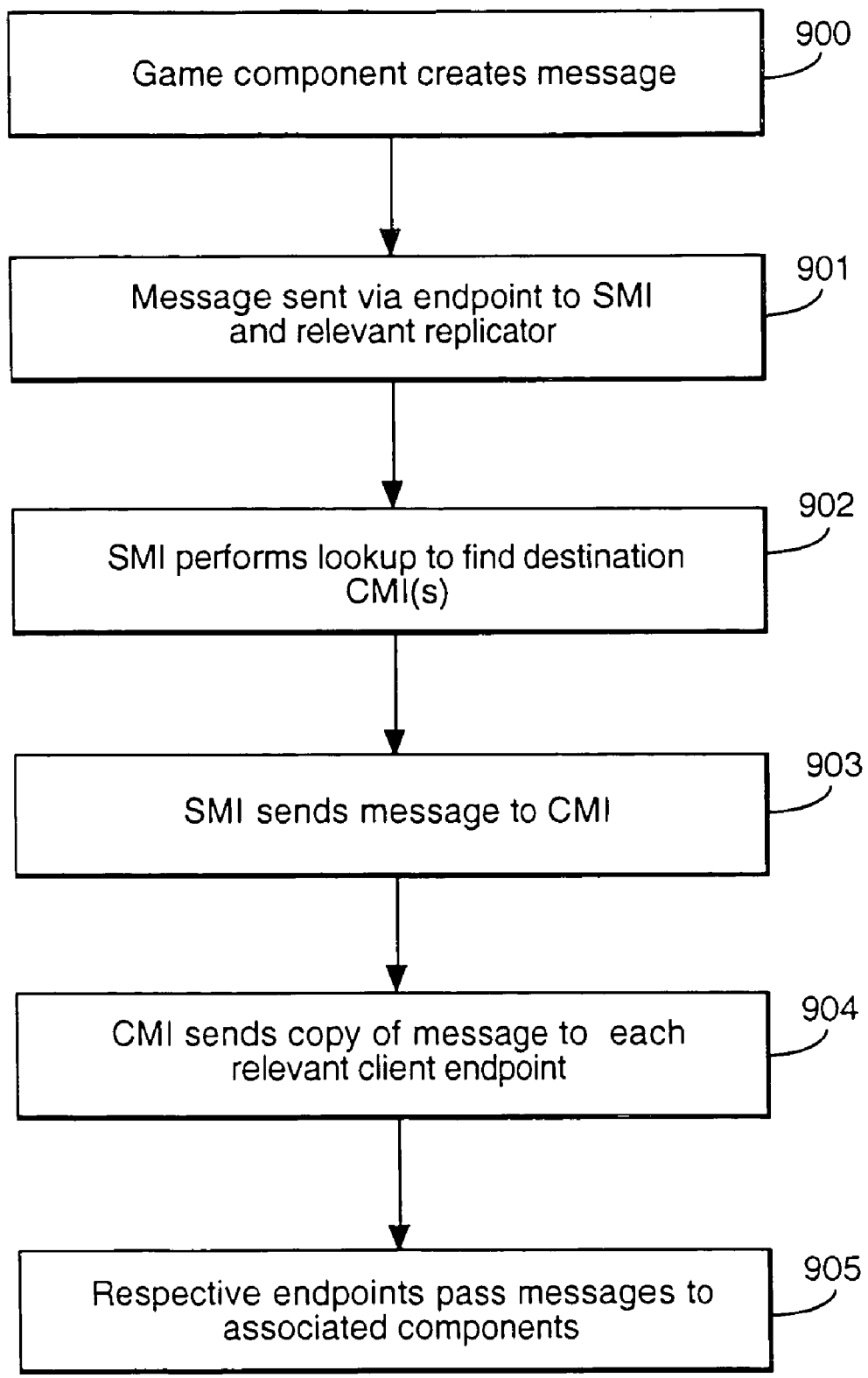
FIG. 9 represents a further messaging process flowchart.

By way of example, the process of sending a message from a component hosted in the server cluster to a number of components hosted on respective client computers will now be illustrated having regard to FIG. 8, illustrating a suitable architecture and FIG. 9, a further process flowchart.

Within a first server computer (800) running a first server process (801), a first game component (802), having an associated endpoint, requires to send a state update message to second, third and fourth game components (803,804,805), hosted respectively in first, second and third client processes (806,807,808) on first, second and third client computers (809,810,811).

In a first step (900), the first game component (802) requests a message and fills it with the requisite state update. This information will be written directly into shared memory.

In a second step (901), the first game component (802) then sends the message, via its associated endpoint, to the relevant predefined Replicator hosted on the Server Messaging Interface (812). The Replicator will, in this case, be the one providing for the delivery of the message to the second, third and fourth game components (803, 804, 805). This step will simply require the transfer of a control code and a pointer into the shared memory from the server process (801) to the Server Messaging Interface (812).

In a third step (902), the Server Messaging Interface (812) then performs a lookup in its outbound routing table to determine to which Client Messaging Interface or Interfaces the message needs to be sent for delivery to the destination endpoints (803, 804, 805). In this case, with all three of the client computers (809, 810, 811) connected to the same Client Messaging Interface (813) hosted on an interface computer (814), only one copy of the message need be sent over the LAN.

In a fourth step (903), the Server Messaging Interface (812) sends the message to the Client Messaging Interface (813).

In a fifth step (904), the Client Messaging Interface (813) sends a copy of the message to each of the client computers (809, 810, 811) hosting the second, third and fourth endpoints (803, 804, 805) and associated game components. As indicated above, a custom transmission protocol may be utilized to reduce latency to a minimum.

In a sixth step (905), the endpoints (803, 804, 805) hosted in the respective client computers each receive the message, and will then pass the message to their associated game components.

In this way, a first game component (802) hosted in the server cluster has been able to send a state update to each one of a second, third and fourth game component hosted on respective client computers (809, 810, 811) whilst keeping network traffic to a minimum.

As indicated above, a further mechanism for dealing with messages delivered to invalid destinations is also provided. This is the mechanism a message sender can use to discover that a particular destination is no longer valid.

When a message is sent it can be marked as requiring an acknowledgement for delivery failure. If the message cannot be delivered because the destination no longer exists, this marking is checked for. If necessary the message is then converted into a 'bounce' message, and returned to the sender. The sender will then receive an incoming message, which will be flagged as "bounced". The sender can then inspect the message to see who it bounced from.

This tracking for failure comes in two forms, specified when the message is sent. One version returns the entire message, allowing the sender to check exactly what data failed to be delivered. The other version returns just the message header. This is useful when a sender needs to identify that a destination is no longer valid, (so that the sender can stop sending to it), but does not need to know exactly what data failed to get through.

It is to be noted that it is this mechanism that allows streams/replicators/sources to detect when a destination is invalid and update their state accordingly. For example, a replicator marks all messages as requiring an acknowledgement of failure. On receiving a bounce message the replicator's endpoint will inform the replicator, and the replicator will remove the destination from its list of valid destinations. If the component requested it, it will also be told about this type of change to one of its distributors.

Suitable Packet Message Format

The messages, which can be transported with either a reliable or an unreliable mechanism, may suitably utilize a format as follows.

Running between the Messaging Interfaces is a transport protocol, that may suitably take the following form:

[4 bytes–header data][2 bytes–payload len][1 bytes–payload type][. . . payload . . . ]

The manner in which each of these 'packets' is treated is dependant on the payload type. One set of options, by way of example, is:

(a) INTER_EMS—The message is internal to the Message Interfaces. The Payload carries information such as update your cache, stop sending me information for endpoint x, endpoint x is now at this location, etc.

(b) DP_TO_DP—The message is intended for a developer process. The payload in this case is normally endpoint movement data. The header data field gives the identity of the destination developer process.

(c) EP_TO_EP—The message contains an endpoint to endpoint message. The header data field in this case contains the identity of the destination endpoint.

(d) EP_TO_EPS—The message contains an endpoint to multiple endpoints message. The header data field in this case contains the number of destination endpoints, and the actual list of endpoints will be appended to the end of the payload.

This protocol represents the transport protocol that actually carries messages around the system, although of course in terms of raw network terms its actually much more layered than this. For example, sending a message between two endpoints on two Server Messaging Interfaces on an ethernet network would be layered

[ethernet header][IP header][TCP header][Mari Transport header][EP Message Header][Data]

The second layer of the protocol is exposed to endpoints, and a suitable header may take the form indicated in the following table:

---

\*
  * Layout of Endpoint to Endpoint messages
  * 16 byte header
  * bytes 0-1    Length of data that follows the header
  * bytes 2-3    Identity of the distribution mechanism originally used
  *              to send the message -continued

```
* bytes 4-7            Identity of originator of message. In the case of a
*                      bounced messaged this is the identity of the endpoint
*                      the original message bounced off
* bytes 8-9            Sequence Number
* bytes 10-11                    Control Flags
*           bit    0             Set for sequencing on
*           bit    1             Set for reliability on
*           bit    2             Set for control message
*           bit    3             Set for Ack Delivery Failure
*           bit    4             Set for data required with Ack
                                 Delivery Failure
*           bit    5             Set for message is a bounce
                                 message
*           bit    6             Set for debug output on message
*           bits   7-15          Currently unused
* bytes 12-15                    Hints Flags
*           bits   0-7           Priority
*           bits   8-15          Priority time modification
*           bits   16-23         Time to live
*           bits   24-30         Data type
*           bit    31            Set for transmission receipt
*/
```

In similar fashion, sending a message to an endpoint on a client running over a dial-up internet connection may take the form of:

[ppp header][ip header][UDP header][Mari Client Transport header][Mari Client Message header][Data]

ADVANTAGEOUS APPLICATIONS

Outline

Performing load balancing using mobile objects.

Scenario

A common task in large distributed environments is ensuring that moving entities (e.g. the representation of players) are informed of the presence of other mobile entities within a certain range. This is normally termed aura collision detection and can be done through a simple Pythagoras algorithm, but it is an $n^2$ problem.

Approach

Sub-divide the environment into different regions and allocate any region with activity an 'aura manager'. Entities can ask the relevant aura manager(s) to let them know about any new entities that move close to them. As the distribution of entities throughout the world changes that processing overhead associated with each aura manager will vary. The ability to move endpoints makes it very simple to transfer these aura managers around between server hosts without affecting the objects communicating with them, and hence load balancing can be easily achieved.

Outline

Trickling data down to a client whilst the user plays the game (i.e. whilst the client is performing numerous real-time interactions with multiple servers).

Scenario

Rather than make a user wait whilst a client fetches the latest patches and documentation changes, it would be better to trickle updates in the background of a game. The next time the game started this new data could then be automatically incorporated.

Approach

Divide the data to be sent into a series of separate small messages. Send the first few reliably, but with a very low priority, and request a transmission receipt on the last message. Whilst the user is active in the game (and hence generating network traffic) the low priority on these messages will force them to be queued at the head of the client network link. However, when spare slots arise on this link one of these packets will be sent, and when all have been sent a transmission receipt will be delivered to the sender. The process can now be repeated with the next group of messages.

Outline

Dividing functionality between servers.

Scenario

An intelligent mobile non-player character in a game has two distinct areas of functionality. One is the complex and specialized AI code plus database required to make it act intelligently. The other is the far more lightweight code and data that represents the behavior of its physical body. Separating the implementation of these two areas offers number of advantages. For example, as the character moves into close proximity to other entities it's beneficial to bring them all into a common address space to improve the accuracy of the physical simulation. However, moving all the data associated with the AI model would impose too high an overhead.

Approach

Place the code and data required for the AI on a server dedicated to the task of providing AI to the game. Place the code and data designed to handle the physical representation into a single mobile object that can move easily around the system. Then link the two together via a pair of streams, which will allow them to communicate in a reliable sequenced way, regardless of what process-hopping the physical representation indulges in.

Outline

Transmitting position updates.

Scenario 1

Sending the position of a player from one client to all the other relevant clients.

Approach

Create an object to represent the player's character and attach it to an endpoint. Create a source on the endpoint with a well-known name nominated for position updates. Any clients interested in the location of the player can subscribe to this source and receive the position updates published to it. This creates very efficient use of the network (the use of a source allows the system to optimize the message routing) and very simple code (the client publishing the information doesn't have to worry about who it needs to send the information to).

Scenario 2

Sending position updates in such a way as to get graceful performance degradation when the total number of position updates sent to a client exceeds the capacity of a client's network link.

Approach

For each moving object predefine a sequence of message priorities to use for it's position update messages. For example, using the list 4,2,3,1 would generate a series of position messages with priorities 4,2,3,1,4,2,3,1,4 etc. Additionally, each position update message is assigned to a time to live equal to the period between position updates. A lightly loaded client link will handle all position updates as they arrive. As the volume grows the lower priority messages will be stalled and then timed out. In this way, whilst the accuracy of the world model at the client will be degraded under excess loading, it will degrade in a graceful linear way that minimizes the worst case error. Note also that careful choice of the priority list used for each object can allow important objects to be given priority in the client link utilization (e.g. A mainly decorative object might use the list 4,4,4,4,4,1 to ensure that under heavy loading only 1 in 6 of its updates is delivered.

The invention claimed is:

1. A method of providing communication between two or more software elements, a host computer means being arranged to host application programs to host application software elements in a host space, two or more application software elements being hosted in said host space; the method comprising:

associating each application software element with a communication software element level through which to send and/or receive messages, said communication software elements holding attributes for enabling inter-object communication;

holding the communication state of each associated application software element in its associated communication software element, such communication state holding at least one message intended for the associated application software element;

allowing each application software element to communicate with other application software elements by sending and receiving messages through the respectively associated communication software elements;

allowing movement of each application software element and its associated communication software element within said host space wherein said movement involves converting an application software element and its associated communication software element into respective messages and separately transmitting each message to a destination location in said host space, the communication software element being enabled, when reconstructed at the destination location, to receive and hold messages intended for said application software element until the application software element is reconstructed, at which time the held messages are automatically passed to the application software element.

2. A method as in claim 1 in which said host computer means comprises two or more host computers and wherein the step of allowing each application software element and associated communication software element to move in said host space comprises allowing each application software element and associated communication software element to move between said two or more host computers.

3. A method as in claim 1 in which the step of holding the communication state of the associated application software element comprises holding a unique communication identity.

4. A method as in claim 3 further comprising:

determining, in response to receiving the unique communication identity of a selected application software element, on which of said host computers said selected application software element resides.

5. Apparatus to provide for communication between two or more software elements, said apparatus comprising:

host computer means arranged to host application programs to host application software elements hosted in said host space, at least two application software elements being hosted in said host space;

each application software element having an associated communication software element through which to send and/or receive messages, said communication software elements holding attributes for enabling inter-object communication;

each communication software element holding the communication state of the associated application software element, such communication state holding at least one message intended for the associated application software element;

messaging means arranged to allow messaging between communication software elements; and movement means arranged to allow software elements to move in said host space; said movement means being arranged to convert an application software element and its associated communication software element into respective messages and separately transmit each message to a destination location in said host space, the communication software element being enabled, when reconstructed at the destination location, to receive and hold messages intended for said application software element until the application software element is reconstructed, at which time the held messages are automatically passed to the application software element.

6. Apparatus as in claim 5 wherein said host computer means comprises two or more host computers and said movement means is arranged to allow movement between said two or more host computers.

7. Apparatus as in claim 5 wherein said communication state includes a unique communication identity.

8. Apparatus as in claim 7 further comprising:
location means arranged to determine, in response to receiving the unique communication identity of a selected application software element, on which of said host computers said selected application software element resides.

* * * * *